(12) United States Patent
Kim

(10) Patent No.: US 11,926,494 B2
(45) Date of Patent: Mar. 12, 2024

(54) SYSTEM AND METHOD FOR LOADING CARGO IN VEHICLE

(71) Applicants: Hyundai Motor Company, Seoul (KR); Kia Motors Corporation, Seoul (KR)

(72) Inventor: Byung Moon Kim, Jeollabuk-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 834 days.

(21) Appl. No.: 17/027,278

(22) Filed: Sep. 21, 2020

(65) Prior Publication Data

US 2021/0380358 A1    Dec. 9, 2021

(30) Foreign Application Priority Data

Jun. 8, 2020    (KR) .......................... 10-2020-0069017

(51) Int. Cl.
*B65G 67/20*      (2006.01)
*B65G 43/00*      (2006.01)
*G08G 1/09*       (2006.01)

(52) U.S. Cl.
CPC ............. *B65G 67/20* (2013.01); *B65G 43/00* (2013.01); *G08G 1/09* (2013.01)

(58) Field of Classification Search
CPC ........ B65G 67/20; B65G 43/00; B65G 67/04; G08G 1/09; B60W 40/13; B60W 30/182; B60W 50/14; B60W 40/02; B25J 11/008; B60K 28/08; B60K 35/00; B60Q 1/2611; G01G 19/62; G01G 19/12
See application file for complete search history.

(56) References Cited

U.S. PATENT DOCUMENTS

| | | | |
|---|---|---|---|
| 4,921,578 A * | 5/1990 | Shiraishi ................ | G01G 19/08 177/136 |
| 9,950,881 B2 * | 4/2018 | Bastian .................. | B65G 67/20 |
| 11,378,440 B2 * | 7/2022 | Salter ...................... | G01G 19/12 |
| 11,718,308 B2 * | 8/2023 | Vas ........................ | B60W 40/13 701/124 |
| 2010/0131182 A1 * | 5/2010 | Deegan ............... | G01G 23/3728 701/124 |
| 2019/0143879 A1 * | 5/2019 | Krishnan ............... | G01G 19/12 362/464 |
| 2022/0327824 A1 * | 10/2022 | Rogness ............... | G06T 19/006 |

FOREIGN PATENT DOCUMENTS

CN          106932074 A *   7/2017

* cited by examiner

*Primary Examiner* — Patrick H Mackey
(74) *Attorney, Agent, or Firm* — Fox Rothschild LLP

(57) ABSTRACT

A vehicle cargo loading system may include a cargo loading portion for loading cargo therein, wherein the cargo loading portion is divided into predetermined zones, a loading state sensor for sensing a loading state of the cargo for each zone, a loading state display for outputting different colors for the zones based on the loading state of the loaded cargo, a user interface for displaying a loading location or the loading state of the cargo, wherein the user interface is installed on an external door glass of the vehicle, and a cargo loading controller that determines whether the cargo loaded in the zone satisfies a preset reference loading state condition, and outputs a wanting signal when the cargo does not satisfy the reference loading state condition.

18 Claims, 9 Drawing Sheets

LED LIGHTER

BEAM PROJECTOR

GREEN　　　BLUE　　　RED

STEP 1　　STEP 2　　STEP 3
(0~30kg)　(30~60kg)　(equal to or
　　　　　　　　　　greater than
　　　　　　　　　　60 kg)

(A) DEFAULT ENVIRONMENT(4X2, 8ZONE)

GREEN　　　BLUE　　　RED

STEP 1　　STEP 2　　STEP 3
(0~30kg)　(30~60kg)　(60kg이상)
　　　　　　　　　　WARNING SOUND
　　　　　　　　　　OCCURENCE (B) SPECIAL ENVIRONMENT(6X2, 12ZONE)

SYSTEM AND METHOD FOR LOADING CARGO IN VEHICLE

CROSS-REFERENCE TO RELATED APPLICATION

This application claims under 35 U.S.C. § 119(a) the benefit of Korean Patent Application No. 10-2020-0069017, filed in the Korean Intellectual Property Office on Jun. 8, 2020, the entire contents of which are incorporated herein by reference.

BACKGROUND

(a) Technical Field

The present disclosure relates to a system and method for loading cargo in a vehicle, more particularly, to the system and method capable of identifying a cargo loading situation.

(b) Description of the Related Art

Currently, a deck of a vehicle has a space for loading cargo therein, so that the cargo may be loaded. However, a function of sensing or monitoring the cargo loading is limited. Thus, when loading the cargo in a van or a commercial vehicle, cargo drop resulting from a defective loading location may occur. Further, after the cargo loading, a vehicle rollover accident may occur due to the cargo bias. In particular, when the vehicle brakes, vehicle pulling resulting from a loaded item of the cargo may occur.

In particular, in the future, a technology for loading the item using an unmanned robot may be applied to an autonomous van. However, even when loading the cargo in an autonomous vehicle, there is a concern of the cargo drop resulted from the defective loading location.

Therefore, there is a need for a sensing system capable of sensing a loading state when loading the cargo using an unmanned robot.

SUMMARY

An aspect of the present disclosure provides a system and a method for loading cargo in a vehicle capable of sensing a loading state when loading the cargo using an unmanned robot.

Another aspect of the present disclosure provides a system and a method for loading cargo in a vehicle capable of loading cargo at an appropriate location and in an appropriate space to prevent cargo bias and drop resulting from a defective loading location when loading the cargo.

Another aspect of the present disclosure provides a system and a method for loading cargo in a vehicle capable of monitoring a cargo loading state for safe operation when an autonomous vehicle in which the cargo is loaded travels.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a system for loading cargo in a vehicle includes a cargo loading portion for loading the cargo therein, wherein the cargo loading portion is divided into predetermined zones, a loading state sensor for sensing a loading state of the cargo for each zone, a loading state display for outputting different colors for the zones based on the loading state of the loaded cargo, and a cargo loading controller that determines whether the cargo loaded in the zone satisfies a preset reference loading state condition, and outputs a warning signal when the cargo does not satisfy the reference loading state condition.

In one implementation, the loading state sensor may include at least one of a weight sensor for sensing a weight of the cargo, a cargo volume sensor for sensing a volume of the cargo, or a cargo importance identifying sensor.

In one implementation, the cargo loading controller may determine whether cargo having a weight equal to or greater than a preset critical weight is loaded in the zone, and output the waning signal when the cargo having the weight equal to or greater than the preset critical weight is loaded.

In one implementation, the cargo loading controller may output the warning signal when a location of the loaded cargo is changed, when a difference in a cargo loading density of the zones is out of a predetermined critical range, or when an importance of the cargo deviates from an importance critical value of the cargo.

In one implementation, the system may further include a video device for visually transmitting the waning signal to a user or an audio device for acoustically transmitting the warning signal to the user.

In one implementation, the cargo loading controller may call an outside emergency vehicle when the warning signal is provided to the video device or the audio device for a predetermined time or longer.

In one implementation, the loading state display may include a weight display for outputting different colors for the zones based on a weight level of the loaded cargo, and the weight display may include each LED light device installed for each zone in the cargo loading portion to display a first color, a second color, and a third color based on a weight level of cargo loaded in each zone, or each beam projector installed for each zone at a top of a roof of the vehicle to display the first color, the second color, and the third color based on the weight level of the cargo loaded in each zone.

In one implementation, the cargo loading controller may set a special environment mode and a default mode based on a travel environment of the vehicle, and set a number of zones corresponding to the special environment mode to be greater than a number of zones corresponding to the default mode.

In one implementation, the cargo loading controller may differently set a critical value of a weight or a volume of the cargo loaded into the zone in the special environment mode and a critical value of a weight or a volume of the cargo loaded into the zone in the default mode.

In one implementation, the special environment mode may be set when the vehicle travels in a snowy or rainy weather condition or travels off-road or on a curved road.

In one implementation, the system may further include a user interface for displaying a loading location or the loading state of the cargo, wherein the user interface is installed on an external door glass of the vehicle.

In one implementation, the system may further include a user terminal for displaying a loading location or the loading state when loading or unloading the cargo and displaying a loading guide direction of the cargo when loading the cargo and a unloading guide direction of the cargo when unloading the cargo.

In one implementation, the system may further include an unmanned robot for loading or unloading the cargo to or from the cargo loading portion based on a loading location or the loading state.

According to another aspect of the present disclosure, a method for loading cargo in a vehicle includes: sensing, by a loading state sensor, a loading state of the cargo loaded in a cargo loading portion divided into predetermined zones for each zone; outputting, by a loading state display, different colors for the zones based on the loading state of the loaded cargo; determining, by a loading state controller, whether the cargo loaded in the zone satisfies a preset reference loading state condition; and outputting, by the loading state controller, a warning signal when the cargo does not satisfy the reference loading state condition.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
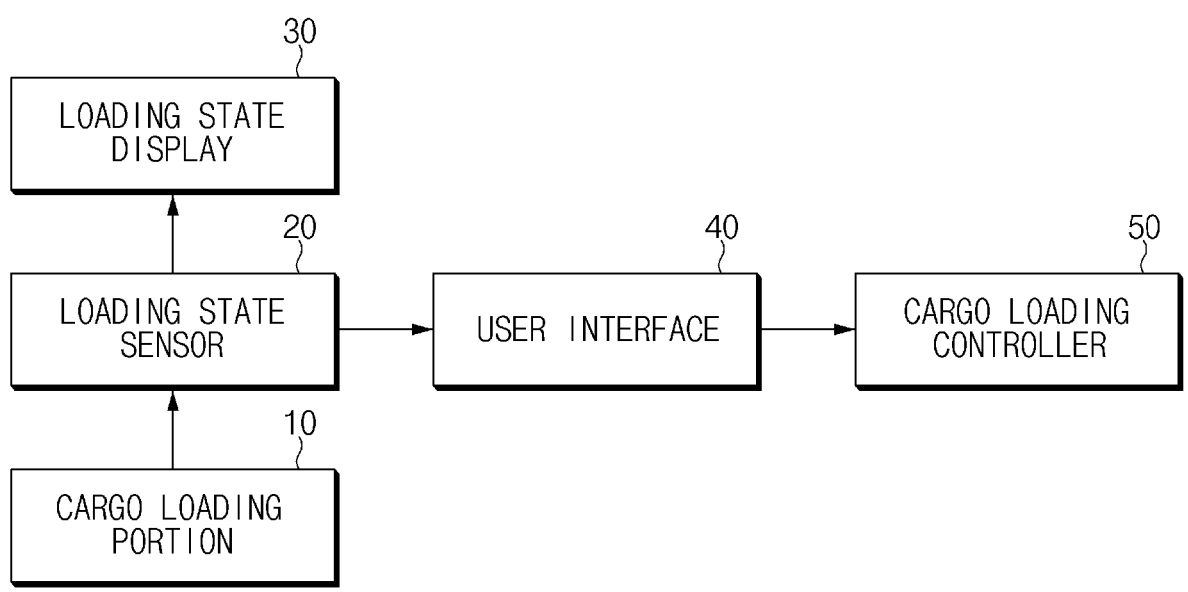
FIG. 1 is a control block diagram of a vehicle cargo loading system according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in detail with reference to FIGS. 1 to 8.

FIG. 1 is a control block diagram of a vehicle cargo loading system according to an embodiment of the present disclosure.

As shown in FIG. 1, a vehicle cargo loading system according to the present embodiment may include a cargo loading portion 10 for loading cargo therein and divided into predetermined zones, a loading state sensor 20 for sensing a loading state of the cargo for each zone, a loading state display 30 for outputting different colors for the zones based on the loading states of the loaded cargo, a user interface 40 for displaying a loading location or the loading state of the cargo and installed on an external door glass of a vehicle, and a cargo loading controller 50 for determining whether the cargo loaded in the zone satisfies a preset reference loading state condition, and outputting a warning signal when the cargo does not satisfy the reference loading state condition.

The cargo loading portion 10 may refer to an independent space secured by a bottom surface and secured upwards from the bottom surface, capable of loading the cargo into the vehicle. Hereinafter, for convenience of description, the bottom surface on which the cargo is loaded may be referred to as the cargo loading portion 10. Such cargo loading portion 10 may be divided into certain spaces in which the cargo may be loaded, and the certain spaces may be referred to as the zones. The zone may be a unit capable of identifying the loading state of the cargo, and the number of zones may be adjusted based on a travel environment.

The loading state sensor 20 may include at least one of a weight sensor for sensing a weight of the cargo, a cargo volume sensor for sensing a volume of the cargo, or a cargo importance identifying sensor. That is, the loading state sensor 20 may be implemented as a sensor capable of quantitatively sensing the loading state of the cargo. The cargo importance identifying sensor may include a barcode reader capable of reading an importance assigned to each cargo.

The loading state display 30 outputs the different colors based on the loading states, which may output various colors based on weight levels of the cargo, volume levels of the cargo, or the importance of the cargo.

Figure 2:
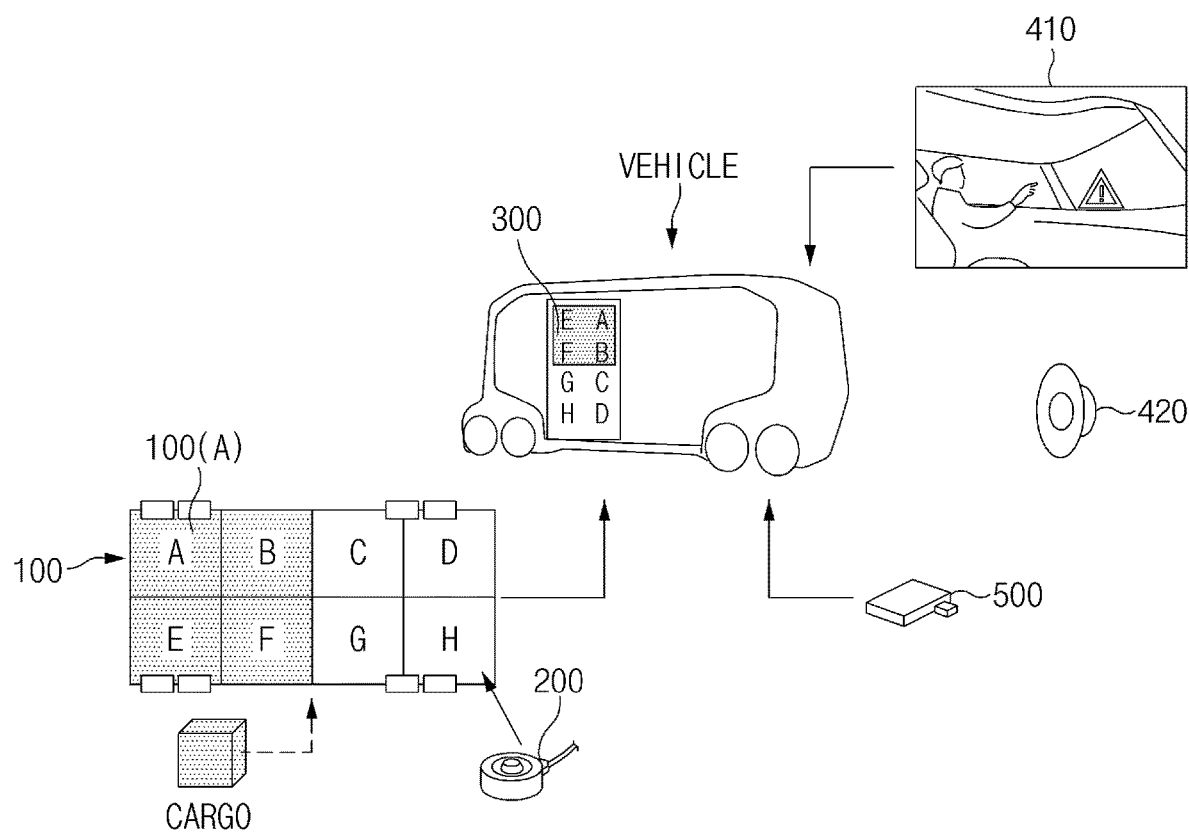
FIG. 2 is a schematic diagram of a vehicle cargo loading system according to another embodiment of the present disclosure.

The user interface 40 may correspond to an image display user interface that is disposed on the exterior glass door of the vehicle as shown in FIG. 2 to be described later to allow a user to intuitively understand the loading state of the vehicle, and may display various colors, characters, or the like based on the loading state.

The cargo loading controller 50 may determine whether the cargo satisfies the preset reference loading state condition, that is, whether cargo having a weight equal to or greater than a preset critical weight is loaded in the zone, whether cargo having a volume equal to or greater than a preset critical volume is loaded in the zone, or whether cargo having an importance equal to or higher than a preset critical importance is loaded in the zone. In addition, the cargo loading controller 50 may output the waning signal when the sensed loading state of the cargo does not satisfy the reference loading state condition.

To this end, the cargo loading controller 50 may set a special environment mode and a default mode based on the travel environment of the vehicle, and may change the cargo loading state based on the special environment mode or the default mode.

For example, the cargo loading controller 50 may set a number of zones corresponding to the special environment mode to be greater than a number of zones corresponding to the default mode, and may differently set a critical value of a weight or a volume of the cargo loaded into the zone in the special environment mode and a critical value of a weight or a volume of the cargo loaded into the zone in the default mode.

In particular, the special environment mode may be set when the vehicle travels in a snowy or rainy weather condition or travels off-road or on a curved road, and the default mode may be set for other travel conditions.

Hereinafter, it will be described as an example that the vehicle loading state is the weight of the cargo. As described above, in addition to the weight of the cargo, the loading state may be determined by the volume of the cargo, a density of the cargo, the importance of the cargo, and the like, and various warning signals may be output accordingly. It will be apparent to those skilled in the art that embodiments to be described later may be adopted or applied depending on whether the loading state deviates from the reference loading state condition.

FIG. 2 is a schematic diagram of a vehicle cargo loading system according to an embodiment of the present disclosure.

As shown in FIG. 2, the vehicle cargo loading system is a system for loading the cargo into the vehicle, which may include a cargo loading portion 100, a weight sensor 200, a user interface 300, a weight display (FIG. 3), a video device 410 or an audio device 420, and a cargo loading controller 500 for controlling those.

As shown in FIG. 2, the cargo loading portion 100 in which the cargo is loaded is divided into predetermined zones 100(A) to 100(H), and each weight sensor 200 is installed for each zone to sense the weight of the cargo for each of the zones 100(A) to 100(H). For example, the cargo loading portion 100 may be divided into 8 zones.

When the number of zones is changed, the weight sensor 200 may sense a cargo weight corresponding to the changed zone. Therefore, the number of weight sensors 200 may correspond to the number of zones that may be distinguished as the maximum.

The user interface 300 is an interface that displays the loading location and/or the weight level of the cargo, which may be installed on the external door glass of the vehicle as shown. When cargo is loaded in A, B, E, and F of the 8 zones, such situation is displayed on the external door glass, so that the user or a manager loading the cargo may intuitively recognize the cargo loading state.

Figure 3:
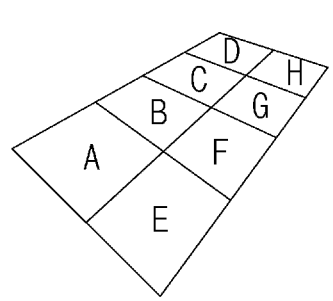
FIG. 3 is a view showing a weight display according to an embodiment of the present disclosure.
Figure 3:
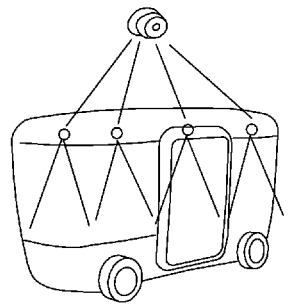

The weight display outputs different colors for the zones based on the weight levels of the loaded cargo, which is shown in FIG. 3.

As shown in FIG. 3, the weight display may be implemented as each LED light device installed for each zone in the cargo loading portion 100 to display a first color, a second color, and a third color based on the weight level of the cargo loaded in each zone, or each beam projector installed for each zone at a top of a roof to display the first color, the second color, and the third color based on the weight level of the cargo loaded in each zone. The first color, the second color, and the third color may be, for example, a green, a blue, and a red.

Figure 4:
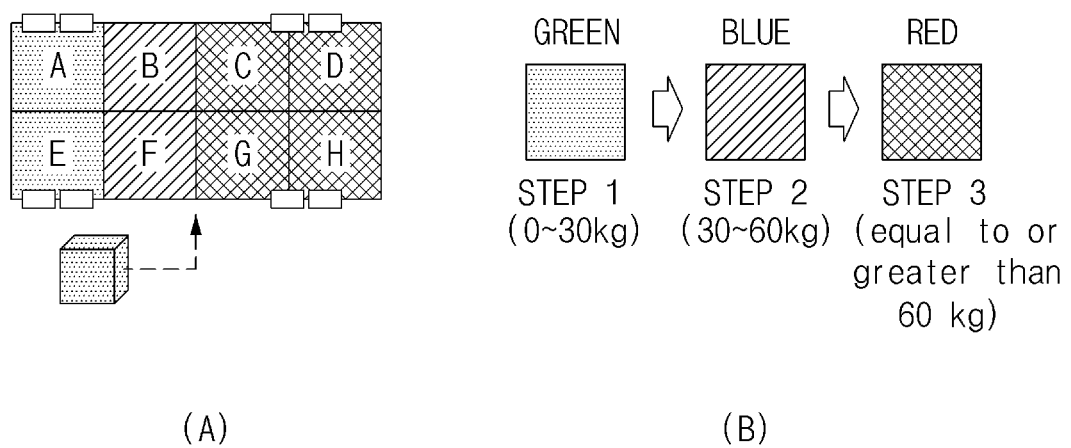
FIG. 4 is a diagram for illustrating a color change of a weight display based on a cargo weight according to an embodiment of the present disclosure.

Such LED light device or beam projector may output a variety of colors corresponding to a predetermined weight step as shown in FIG. 4. For example, such LED light device or beam projector may output the green when the weight of the cargo loaded in the zone is a step 1 (0 to 30 kg), the blue when the weight of the cargo loaded in the zone is a step 2 (30 to 60 kg), and the red when the weight of the cargo loaded in the zone is a step 3 (equal to or greater than 60 kg).

Alternatively, when cargo having a weight equal to or greater than the predetermined critical weight is loaded in a specific zone, the LED light device or the beam projector may output a waning color, such as a black or a fluorescent color, or may flicker red light.

When the LED light device or the beam projector outputs the flickering light, the fluorescent color, or the like, it may be considered that cargo having a weight greater than the critical weight that may be allowed in the zone is loaded. The user may intuitively determine a weight state of the cargo through the LED light device or the beam projector.

In one example, the weight step may be variously set based on a size of the vehicle, and a loading allowance of the cargo. That is, the weight step may be appropriately set based on a vehicle operating environment, for example, various conditions such as the weather condition, a road condition or characteristics of the cargo being loaded, such as whether the cargo is a hard solid or a fluid object, the volume of the cargo, and the like. Such weight step may be set automatically by the user, or by the cargo loading controller 500 based on preset data.

In addition, the weight step may be subdivided into more steps than the three steps shown, and correspondingly, the number of colors output from the LED light device or the beam projector may be increased.

In one example, the cargo loading controller 500 may change the number of zones based on the travel environment of the vehicle. In addition, the critical weight of the cargo may be changed based on the travel environment. The cargo loading controller 500 may be implemented as an integrated auxiliary motor control unit (ACU) that may control a warning system by determining and managing whether the cargo is loaded and generating the waning signal.

Figure 5:
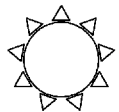
FIG. 5 is a diagram for illustrating a critical weight for a travel environment according to an embodiment of the present disclosure.
Figure 5:
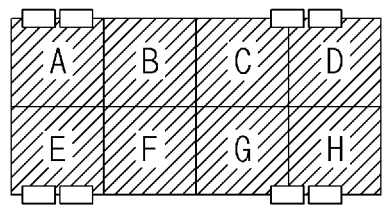
Figure 5:
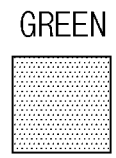
Figure 5:
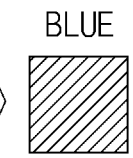
Figure 5:
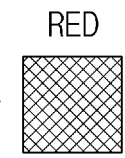
Figure 5:
Figure 5:
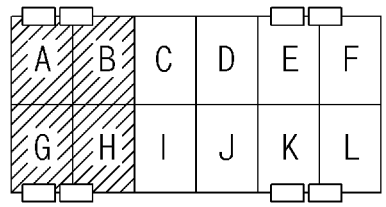
Figure 5:
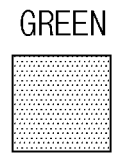
Figure 5:
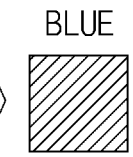
Figure 5:
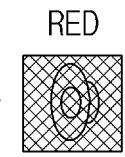

FIG. 5 is a diagram for illustrating a critical weight for a travel environment according to an embodiment of the present disclosure.

The cargo loading controller 500 may identify the case in which the vehicle travels in a snowy or rainy weather condition or travels off-road or on a curved road as the special environment, and may set the number of zones in the special environment to be greater than the number of zones when traveling in the default environment rather than the special environment. As described above, when an amount of cargo loaded in one zone is adjusted by subdividing loading distinction, a gravity sensing force is increased, thereby loading the cargo more safely.

As shown in FIG. 5, the cargo loading portion 100 may be divided into 8 zones of 4×2 in a default environment A, and may be divided into 12 zones of 6×2 in a special environment B.

In addition, in the default environment A, when cargo at a step equal to or higher than the step 3 is loaded, red light is output from the weight displays 410 and 420. However, in the special environment B, when the cargo weight is equal to or greater than 60 kg, the cargo weight may be determined as the critical weight and the warning sound may be generated. That is, in the special environment B, the weight critical value of the loaded cargo may be set low. This may reduce risks associated with cargo transportation, including a rollover accident. That is, the cargo loading controller 500 may set the critical weight applied to the special environment to be lower than the critical weight applied to the default environment.

In one example, the cargo loading controller 500 may determine whether the cargo having the weight equal to or greater than the preset critical weight is loaded in the zone, and output the warning signal when the cargo having the weight equal to or greater than the preset critical weight is loaded. Alternatively, the cargo loading controller 500 may determine whether the location of the loaded cargo is changed or a difference in a cargo loading density of the zones is out of a predetermined critical range, and output the warning signal when the cargo location is changed or the difference in the cargo loading density of the zones is out of the predetermined critical range.

For example, when the loading state of the cargo becomes bad as the cargo deviates from the loaded location and drops or biases in a process in which the vehicle makes a sudden stop or travels on the curved road such as cornering the warning signal may be output.

Such warning signal may be output through the video device 410 and/or the audio device 420, as shown in FIG. 2, and transmitted to the user. The video device 410 may be implemented as a screen of a driver's windshield and visually transmit the warning signal to the user, and the audio device 420 may be implemented as a warning buzzer or the like and acoustically transmit the warning signal to the user.

In one example, the cargo loading controller 500 may call an outside emergency vehicle when the warning signal is provided to the video device 410 or the audio device 420 for a predetermined time or longer.

Figure 6:
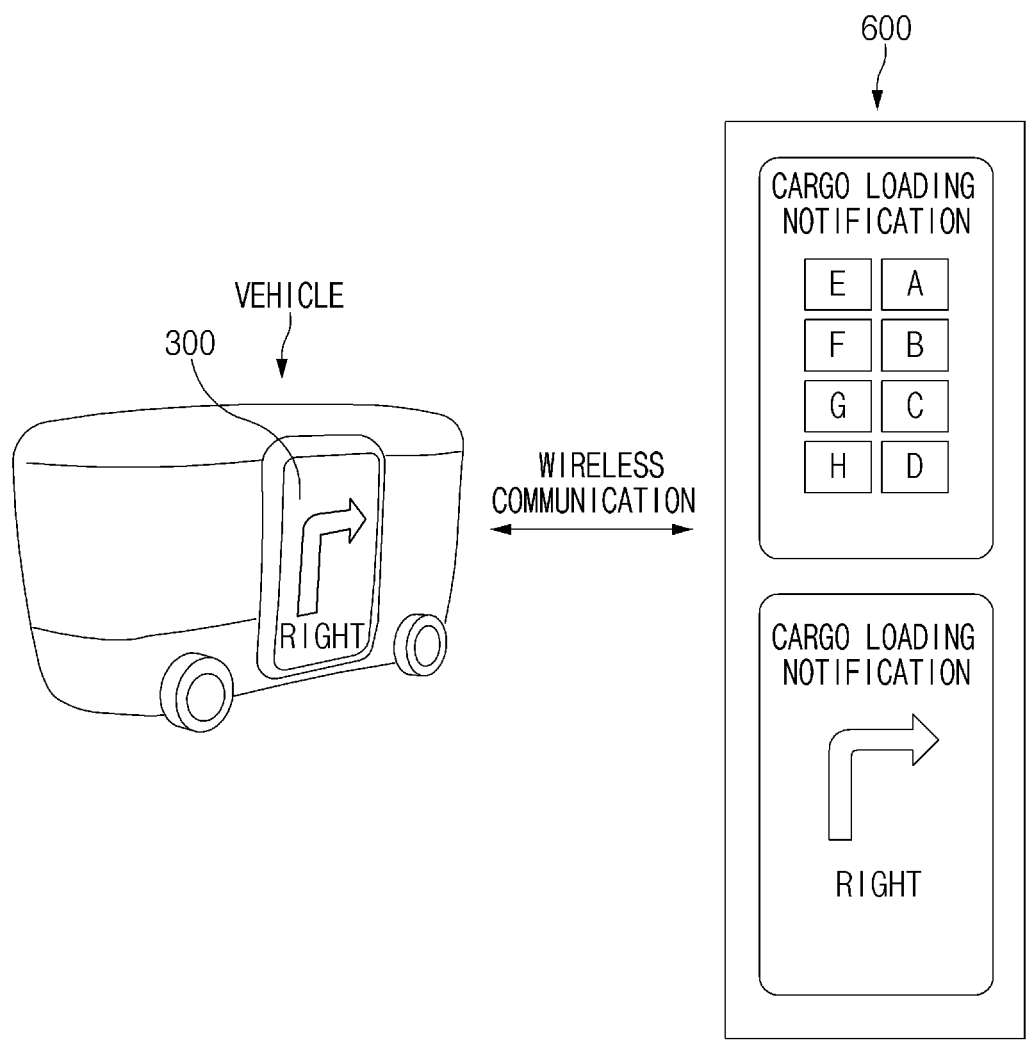
FIG. 6 is a diagram illustrating a user terminal according to an embodiment of the present disclosure.

FIG. 6 is a diagram illustrating a user terminal according to an embodiment of the present disclosure.

In one example, the cargo loading system according to an embodiment may further include a user terminal 600 that displays the loading location or the weight level when loading or unloading the cargo, and displays a loading guide direction of the cargo when loading the cargo and an unloading guide direction of the cargo when unloading the cargo.

When the user with the user terminal 600 approaches the vehicle, the loading and unloading guide directions of the cargo may be displayed on the user terminal 600, and a location alarm for the cargo to be unloaded may be displayed when the cargo is unloaded.

As shown in FIG. 6, the loading and unloading guide directions of the cargo may be displayed on an external door screen of the vehicle as well as on the user terminal 600.

The cargo loading controller 500 in the vehicle and the user terminal 600 may transmit and receive a control signal and information about the cargo loading state through wireless communication.

Alternatively, the user terminal 600 may receive a call signal transmitted from the vehicle, and may transmit an ack signal corresponding thereto.

A predetermined application capable of displaying the signal received from the cargo loading controller 500 and deriving and displaying the loading and unloading guide directions of the cargo may be installed on the user terminal 600.

Figure 7:
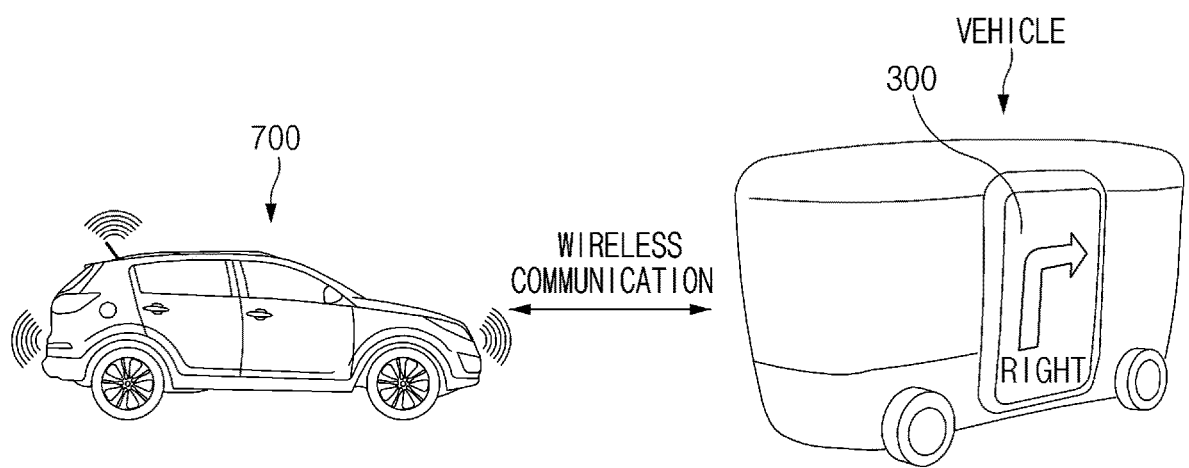
FIG. 7 is a diagram for illustrating an unmanned robot according to an embodiment of the present disclosure.

FIG. 7 is a diagram for illustrating an unmanned robot according to an embodiment of the present disclosure.

As shown in FIG. 7, the cargo loading system may further include an unmanned robot 700 for loading or unloading the cargo to or from the cargo loading portion 100 based on the loading location or the weight level.

The unmanned robot 700 may perform short-range wireless communication with the cargo loading controller 500, load the cargo in an appropriate zone based on various wireless signals obtained from the cargo loading controller 500, and unload the loaded cargo based on a preset or identified unloading route.

Figure 8:
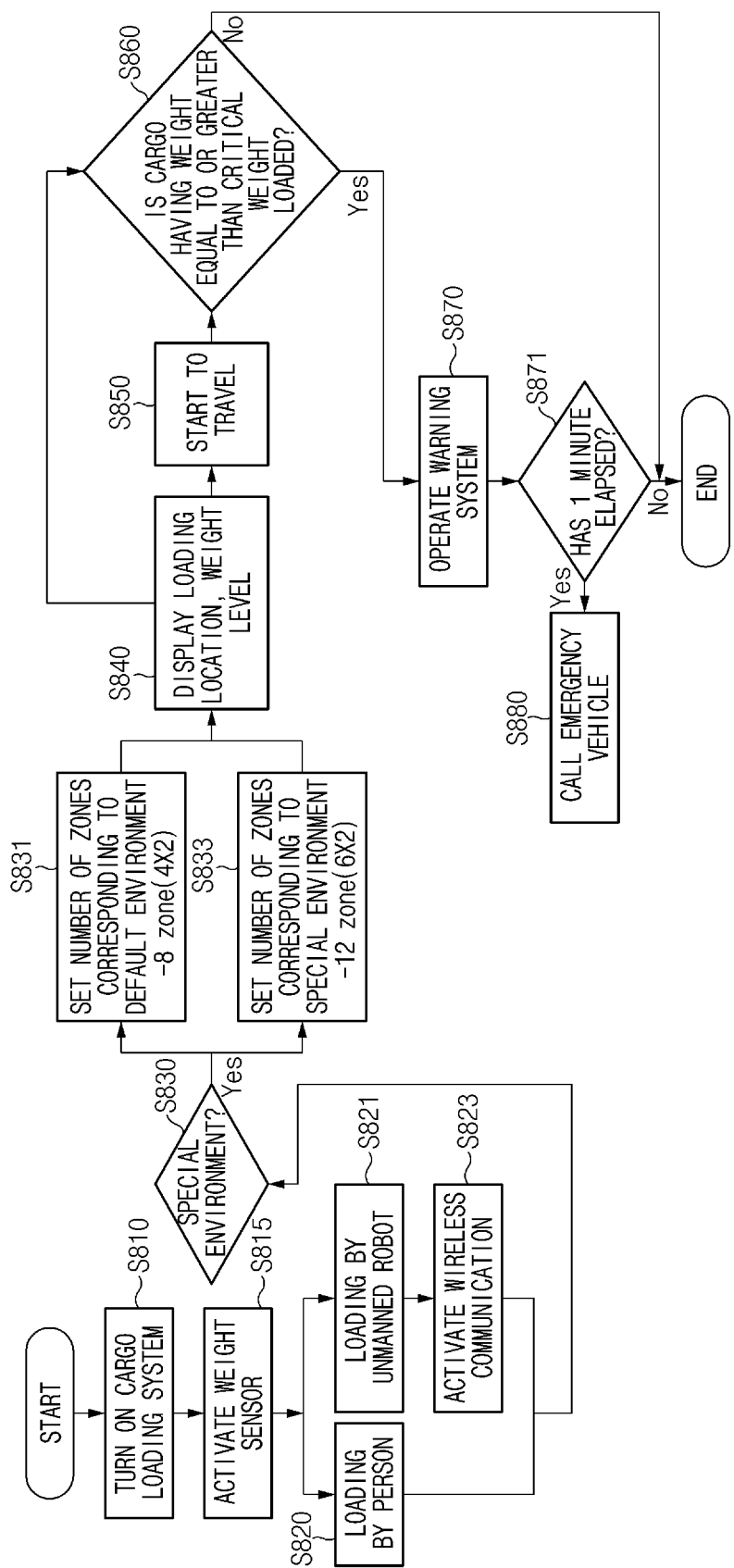
FIG. 8 is a control flowchart for illustrating a vehicle cargo loading method according to an embodiment of the present disclosure.

FIG. 8 is a control flowchart for illustrating a vehicle cargo loading method according to an embodiment of the present disclosure.

As shown in FIG. 8, the cargo loading system is turned on to load the cargo in the vehicle (S810), and the weight sensor 200 disposed in the cargo loading portion 100 in which the cargo is loaded may be activated (S815).

The cargo loading system may be turned on through on/off setting of the driver system, or through operation of a door sensor that informs the start of the cargo loading, that is, performs a wake up function of the system. Thereafter, the cargo loading may be performed by a person or by the unmanned robot (S820 and S821).

When the cargo loading is achieved by the unmanned robot, as shown in FIG. 7, various wireless communication for transmitting and receiving the various control signals may be activated between the unmanned robot 700 and the vehicle (S823). For example, the wireless communication may be an NFC, a Bluetooth, a Wi-Fi, a ZigBee, a Z-Wave, a Beacon, and the like, and the short-range communication.

In one example, the wireless communication as shown in FIG. 6 may be activated between the user terminal 600 that may be carried by the user and the vehicle even when the person loads the cargo.

When the loading of the cargo starts, the cargo loading controller 500 may obtain information about an environment in which the cargo is currently being loaded or an environment in which the vehicle is to be traveled, from the outside or through an application. For example, the cargo loading controller 500 may receive GPS weather information, the road conditions, and the like through an external server or an application installed in the system and driven.

The cargo loading controller 500 may determine whether the current travel environment is the special environment, such as whether the vehicle travels in a snowy or rainy weather condition, whether the vehicle travels off-road or on a curved road, and the like based on the environment information thus obtained (S830).

When the travel environment is the default environment rather than the special environment as a result of the determination, for example, when the weather is clear, there is no specific forecast of wind, rain, or snow, and the road environment is not the off-road or the curved road with severe cornering, the cargo loading controller 500 may divides the zones into the number corresponding to the default environment (S831).

On the other hand, when the travel environment is the special environment described above, the cargo loading controller 500 may divides the zones into a number that is greater than the number of zones when traveling in the default environment (S833).

As shown in FIG. 5, the cargo loading controller 500 may divide the cargo loading portion 100 into the 8 zones of 4×2 in the default environment, and into the 12 zones of 6×2 in the special environment.

That is, the weight sensor 200 installed in the cargo loading portion 100 may sense different regions based on the number of zones of the cargo loading portion 100, and the maximum number of weight sensors 200 may correspond to the number of zones applied in the special environment.

As such, when the number of zones to divide the cargo loading portion 100 is set and the cargo loading is performed, the loading location at which the cargo is loaded and the weight or the weight level indicating the weight may be displayed on the user interface 300, the user terminal 600, the weight display, or the like (S840).

The user may identify the loading state of the cargo through the various interfaces as described above.

In one example, when safe loading is needed because of the special environment, the cargo loaded through a side door of the vehicle may be loaded using a pallet loading structure through a rear trunk of the vehicle. When loading the cargo through a pallet sliding mode, the cargo may be loaded more safely than using the side door of the vehicle.

After the cargo loading process or after the travel has started (S850), the cargo loading controller 500 may determine whether the cargo having the weight equal to or greater than the preset critical weight is loaded into the zone through the weight sensor 200, or whether the location of the loaded cargo is changed or whether the difference in the cargo loading density of the zones is out of the predetermined critical range (S860).

When the cargo having the weight equal to or greater than the preset critical weight is loaded, when the location of the loaded cargo is changed, or when the difference in the cargo loading density of the zones is out of the predetermined critical range, the cargo loading controller 500 outputs the warning signal informing of such situation, so that the warning system is operated (S870).

When the warning system is operated, the warning signal may be displayed as a warning light on the video device 410, such as a glass monitor, to be visually transmitted to the user, or the warning buzzer is operated to be acoustically transmitted to the user. The user may receive both the waning light and the warning sound, or receive the warning signal from one of those that has been set. In one example, such warning signal may also be displayed on the user terminal 600 or a travel information interface such as a navigation used by the user.

When such warning system lasts for a preset time, such as 1 minute, or longer (S871), the cargo loading controller 500 may call the outside emergency vehicle (S880). The emergency vehicle call may be transmitted to an insurance company, a police station, a towing company, or the like.

When the user releases the warning system in the middle or the cargo loading state is improved, the operation of the warning system may be terminated.

As described above, according to the present disclosure, cargo bias and drop resulted from a defective loading location during cargo loading of an autonomous vehicle may be prevented, and real-time loading state sensing may be possible during the cargo loading using the unmanned robot. In addition, provided are a vehicle cargo loading system and a vehicle cargo loading method using the same that may minimize occurrence of an overturned vehicle resulted from cargo bias during travel after cargo loading, and may also ameliorate vehicle pulling due to the cargo during braking.

Figure 9:
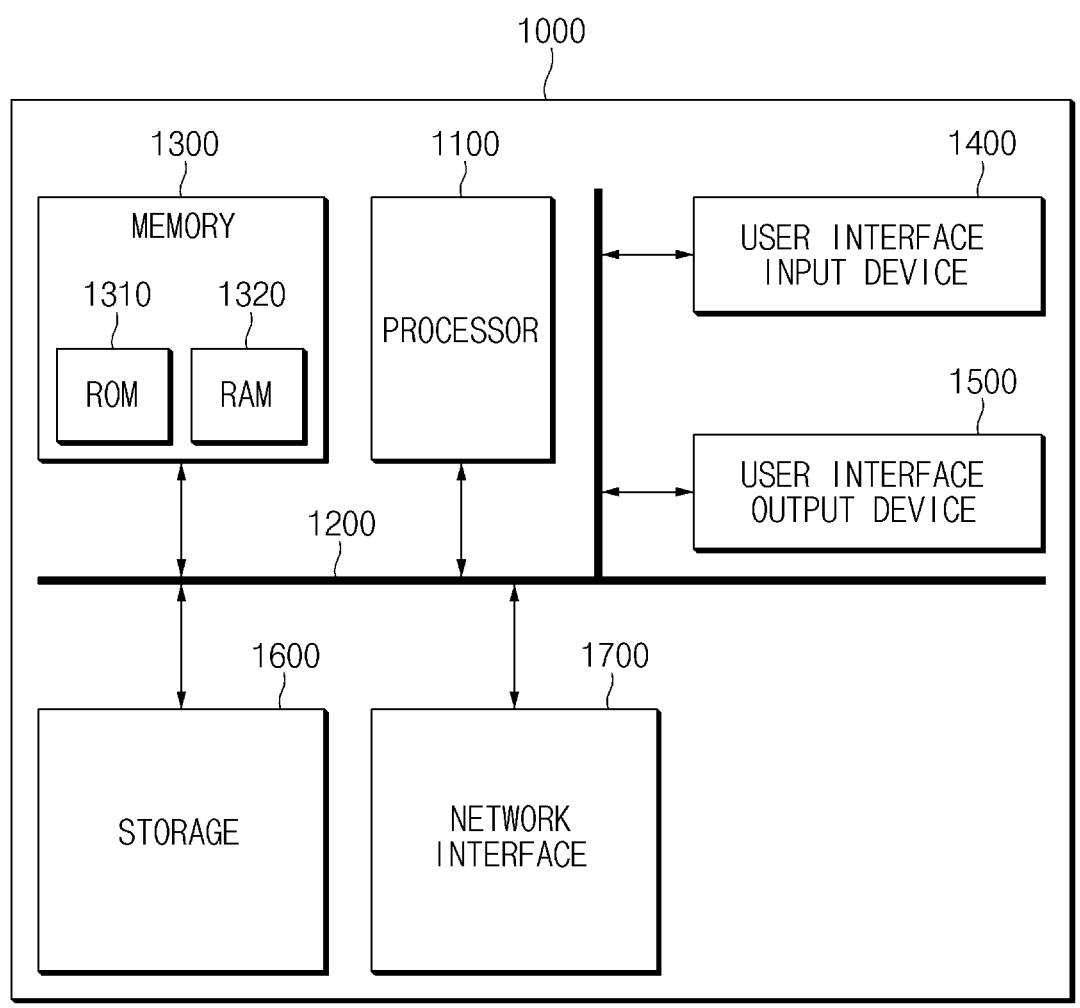
FIG. 9 shows a computing system according to an embodiment of the present disclosure.

FIG. 9 shows a computing system according to an embodiment of the present disclosure.

Referring to FIG. 9, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

The present disclosure provides the system and the method for loading the cargo in the vehicle capable of sensing the loading state when loading the cargo using the unmanned robot.

The present disclosure provides the system and the method for loading the cargo in the vehicle capable of loading the cargo at the appropriate location and in the appropriate space to prevent the cargo bias and drop resulted from the defective loading location when loading the cargo.

The present disclosure provides the system and the method for loading the cargo in the vehicle capable of monitoring the cargo loading state for the safe operation when the autonomous vehicle in which the cargo is loaded travels.

In addition, through proper loading of the cargo, safe travel and transportation of an autonomous van is possible.

In addition, various effects that may be directly or indirectly identified through this document may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A system for loading cargo in a vehicle, the system comprising:
    a cargo loading portion for loading the cargo therein, wherein the cargo loading portion is divided into predetermined zones;
    a loading state sensor for sensing a loading state of the cargo for each zone;
    a loading state display for outputting different colors for the zones based on the loading state of the loaded cargo; and
    a cargo loading controller configured to:
        determine whether the cargo loaded in the zone satisfies a preset reference loading state condition; and
        output a warning signal when the cargo does not satisfy the reference loading state condition;
    wherein the cargo loading controller is configured to:
        set a special environment mode and a default mode based on a travel environment of the vehicle; and
        set a number of zones corresponding to the special environment mode to be greater that a number of zones corresponding to the default mode.
2. The system of claim 1, wherein the loading state sensor includes at least one of a weight sensor for sensing a weight of the cargo, a cargo volume sensor for sensing a volume of the cargo, or a cargo importance identifying sensor.

3. The system of claim 2, wherein the cargo loading controller is configured to:
    determine whether the cargo having a weight equal to or greater than a preset critical weight is loaded in the zone; and
    output the warning signal when the cargo having the weight equal to or greater than the preset critical weight is loaded.

4. The system of claim 1, wherein the cargo loading controller is configured to output the warning signal when a location of the loaded cargo is changed, when a difference in a cargo loading density of the zones is out of a predetermined critical range, or when an importance of the cargo deviates from an importance critical value of the cargo.

5. The system of claim 1, further comprising:
    a video device for visually transmitting the warning signal to a user or an audio device for acoustically transmitting the warning signal to the user.

6. The system of claim 5, wherein the cargo loading controller is configured to call an outside emergency vehicle when the warning signal is provided to the video device or the audio device for a predetermined time or longer.

7. The system of claim 1, wherein the loading state display includes a weight display for outputting different colors for the zones based on a weight level of the loaded cargo,
    wherein the weight display includes:
        each LED light device installed for each zone in the cargo loading portion to display a first color, a second color, and a third color based on a weight level of the cargo loaded in each zone; or
        each beam projector installed for each zone at a top of a roof of the vehicle to display the first color, the second color, and the third color based on the weight level of the cargo loaded in each zone.

8. The system of claim 1, wherein the cargo loading controller is configured to differently set a critical value of a weight or a volume of the cargo loaded into the zone in the special environment mode and a critical value of a weight or a volume of the cargo loaded into the zone in the default mode.

9. The system of claim 1, wherein the special environment mode is set when the vehicle travels in a snowy or rainy weather condition or travels off-road or on a curved road.

10. The system of claim 1, further comprising:
    a user interface for displaying a loading location or the loading state of the cargo, wherein the user interface is installed on an external door glass of the vehicle.

11. The system of claim 1, further comprising:
    a user terminal for displaying a loading location or the loading state when loading or unloading the cargo and displaying a loading guide direction of the cargo when loading the cargo and a unloading guide direction of the cargo when unloading the cargo.

12. The system of claim 1, further comprising:
    an unmanned robot for loading or unloading the cargo to or from the cargo loading portion based on a loading location or the loading state.

13. A method for loading cargo in a vehicle, the method comprising:
    sensing, by a loading state sensor, a loading state of the cargo loaded in a cargo loading portion divided into predetermined zones for each zone;

outputting, by a loading state display, different colors for the zones based on the loading state of the loaded cargo;

determining, by a cargo loading controller, whether the cargo loaded in the zone satisfies a preset reference loading state condition;

outputting, by the cargo loading controller, a warning signal when the cargo does not satisfy the reference loading state condition;

setting, by the cargo loading controller, a special environment mode and a default mode based on a travel environment of the vehicle, wherein the special environment mode is set when the vehicle travels in a snowy or rainy weather condition or travels off-road or on a curved road; and setting, by the cargo loading controller, a number of zones corresponding to the special environment mode to be greater that a number of zones corresponding to the default mode.

14. The method of claim 13, wherein the outputting of the warning signal includes:
outputting the warning signal when a location of the loaded cargo is changed, when a difference in a cargo loading density of the zones is out of a predetermined critical range, or when an importance of the cargo deviates from an importance critical value of the cargo.

15. The method of claim 13, further comprising:
visually or acoustically transmitting the warning signal to a user.

16. The method of claim 15, further comprising:
calling an outside emergency vehicle when the warning signal is provided for a predetermined time or longer.

17. The method of claim 13, wherein the outputting of the different colors for the zones includes:
displaying a first color, a second color, and a third color based on a weight level of the cargo loaded in each zone of the cargo loading portion; or
displaying a first color, a second color, and a third color based on the weight level of the cargo loaded in each zone of roof of the vehicle.

18. The method of claim 13, further comprising:
differently setting a critical value of a weight or a volume of the cargo loaded into the zone in the special environment mode and a critical value of a weight or a volume of the cargo loaded into the zone in the default mode.

* * * * *